(12) United States Patent
Ono et al.

(10) Patent No.: US 10,751,871 B2
(45) Date of Patent: Aug. 25, 2020

(54) ROBOT AND METHOD OF CONTROLLING THE SAME

(71) Applicant: KAWASAKI JUKOGYO KABUSHIKI KAISHA, Kobe-shi, Hyogo (JP)

(72) Inventors: Seita Ono, Kakogawa (JP); Tianfen Xu, Kakogawa (JP); Junichi Matsuoka, Kobe (JP); Hiroki Kokushi, Kakogawa (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 313 days.

(21) Appl. No.: 15/748,907

(22) PCT Filed: Jul. 30, 2015

(86) PCT No.: PCT/JP2015/003847
§ 371 (c)(1),
(2) Date: Jan. 30, 2018

(87) PCT Pub. No.: WO2017/017710
PCT Pub. Date: Feb. 2, 2017

(65) Prior Publication Data
US 2018/0215035 A1 Aug. 2, 2018

(51) Int. Cl.
*B25J 9/16* (2006.01)
*B25J 13/08* (2006.01)
(Continued)

(52) U.S. Cl.
CPC ........... *B25J 9/0096* (2013.01); *B25J 9/0087* (2013.01); *B25J 9/044* (2013.01); *B25J 9/1679* (2013.01);
(Continued)

(58) Field of Classification Search
CPC .................................. B25J 13/08; B25J 19/02
See application file for complete search history.

(56) References Cited

U.S. PATENT DOCUMENTS

2012/0053724 A1* 3/2012 Okamoto ............... B25J 9/1697
700/114
2012/0215350 A1 8/2012 Murayama et al.
(Continued)

FOREIGN PATENT DOCUMENTS

JP      H09-57543 A     3/1997
JP      2005-46966 A    2/2005
(Continued)

OTHER PUBLICATIONS

Sep. 8, 2015 Search Report issued in International Patent Application No. PCl/JP2015/003847.
(Continued)

*Primary Examiner* — Kira Nguyen
(74) *Attorney, Agent, or Firm* — Oliff PLC

(57) ABSTRACT

The robot includes a first arm having a first hand part provided to a tip end thereof, and at least one joint shaft provided between a pedestal and the first hand part, a first acting part configured to contact a given table-like body on which a plurality of workpieces are able to be placed, while the first acting part is provided to the first hand part, a controller, an imaging unit configured to two-dimensionally image a placement surface of the workpieces in the table-like body in a perpendicular direction to the placement surface, and a recognition part configured to recognize a position of the workpiece by performing a two-dimensional pattern matching based on an image two-dimensionally captured by the imaging unit. The controller vibrates the table-like body by controlling the first arm so that the first acting part acts on the table-like body.

7 Claims, 9 Drawing Sheets

(51) Int. Cl.
*B25J 9/00* (2006.01)
*B25J 15/00* (2006.01)
*B25J 9/04* (2006.01)
*B25J 15/06* (2006.01)
*B25J 19/02* (2006.01)

(52) U.S. Cl.
CPC ........... *B25J 9/1697* (2013.01); *B25J 13/089* (2013.01); *B25J 15/0066* (2013.01); *B25J 15/0616* (2013.01); *B25J 19/023* (2013.01); *B25J 9/1612* (2013.01); *B25J 15/0004* (2013.01); *G05B 2219/37555* (2013.01); *G05B 2219/40053* (2013.01); *G05B 2219/40205* (2013.01)

(56) References Cited

U.S. PATENT DOCUMENTS

2012/0296474 A1* 11/2012 Irie .................. B25J 9/1687
700/259
2013/0125517 A1   5/2013 Gomi
2014/0316573 A1* 10/2014 Iwatake .............. B25J 9/1694
700/258

FOREIGN PATENT DOCUMENTS

| | | |
|---|---|---|
| JP | 2008-62376 A | 3/2008 |
| JP | 2011-000685 A | 1/2011 |
| JP | 2012-51056 A | 3/2012 |
| JP | 2012-171027 A | 9/2012 |
| JP | 2012-240133 A | 12/2012 |
| JP | 2013-100118 A | 5/2013 |
| JP | 2014-205209 A | 10/2014 |
| JP | 5606424 B2 | 10/2014 |
| WO | 2011/081198 A1 | 7/2011 |

OTHER PUBLICATIONS

Jan. 30, 2018 International Preliminary Report on Patentability issued in International Patent Application No. PCT/JP2015/003847.

* cited by examiner

ROBOT AND METHOD OF CONTROLLING THE SAME

TECHNICAL FIELD

The present disclosure relates to a robot and a method of controlling the same.

BACKGROUND ART

A mode is known that, in a work line comprised of a plurality of operation processes, a robot having a plurality of joints performs a series of operations to receive a workpiece at at least one of the operation processes after an upstream work is finished, and after the work concerned is performed, to send out the workpiece to a downstream side.

Among the plurality of operation processes, it can be considered that the robot performs a process, for example, to take out one workpiece from a container where many workpieces, such as electronic components, are accommodated and to perform a work to the component. Generally, such a process is referred to as "bin picking." For example, in the following Patent Document 1, a workpiece is placed on a given tray, the workpiece is imaged by a plurality of cameras from a plurality of different angles, and the position of the workpiece is acquired three-dimensionally. The workpiece is recognized by performing a pattern matching using a prestored shape of the workpiece based on information on the acquired workpiece and the robot then takes one workpiece out of the plurality of workpieces accommodated in the tray. Here, if the plurality of workpieces accommodated in the tray overlap with each other, the workpiece recognition may not be able to be performed. In order to avoid such a workpiece overlap, a work to uniformly distribute the workpieces in the tray is carried out by vibrating the tray etc. (e.g., refer to Patent Documents 2 and 3, etc.).

REFERENCE DOCUMENTS OF CONVENTIONAL ART

Patent Documents

[Patent Document 1] JP2008-062376A
[Patent Document 2] JP2014-205209A
[Patent Document 3] JP5606424B

DESCRIPTION OF THE DISCLOSURE

Problems to be Solved by the Disclosure

However, with the conventional structure, a jig and/or instrument dedicated to vibrate the tray needs to be arranged around the robot, like Patent Documents 2 and 3. Therefore, in the work line where a human carries out at least one operation process among the plurality of operation processes, if a robot performs, instead of the human, the operation process which has been performed by the human, it is necessary to arrange the jig and/or instrument for exclusive use which is unnecessary when the human performs the operation process. Moreover, it is also necessary to provide an advanced visual recognition system in order for the robot to recognize the workpiece, and to perform a complicated control. As a result, in the conventional work line, there is a problem that it is difficult for the robot to often and easily perform the operation process instead of the human.

The present disclosure is made in view of solving the problem, and one purpose thereof is to provide a robot and a method of controlling the same, which are capable of easily achieving a take-out work of a workpiece, without arranging a jig and/or instrument for exclusive use, and without providing an advanced visual recognition system and performing a complicated control.

SUMMARY OF THE DISCLOSURE

A robot according to one aspect of the present disclosure, which includes a first arm having a first hand part provided to a tip end thereof, and at least one joint shaft provided between a pedestal and the first hand part, a first acting part configured to contact a given table-like body on which a plurality of workpieces are able to be placed, while the first acting part is provided to the first hand part, a controller, an imaging unit configured to two-dimensionally image a placement surface of the workpieces in the table-like body in a perpendicular direction to the placement surface, and a recognition part configured to recognize a position of the workpiece by performing a two-dimensional pattern matching based on an image two-dimensionally captured by the imaging unit. The controller vibrates the table-like body by controlling the first arm so that the first acting part acts on the table-like body.

According to the above configuration, since the table-like body where the workpieces are placed is vibrated by the first acting part provided to the first hand part, flattening work of the workpieces on the table-like body can be achieved without arranging a jig or instrument for exclusive use. In addition, since the position of the workpiece is recognized based on the two-dimensionally captured image, an advanced visual recognition system becomes unnecessary. Therefore, a take-out work of a workpiece is easily achieved without arranging a jig and/or instrument for exclusive use, and without providing an advanced visual recognition system and performing a complicated control.

The robot may include a second arm having a second hand part provided to a tip end thereof, and at least one joint shaft provided between the pedestal and the second hand part, and a second acting part configured to contact the table-like body, while the second acting part is provided to the second hand part. The controller may vibrate the table-like body by controlling the first arm and the second arm so that the first arm and the second arm cooperate, while the table-like body is located between the first acting part and the second acting part. Thus, the table-like body located between the first acting part and the second acting part is vibrated by the cooperation of the first arm and the second arm. Therefore, the cooperation of the two arms easily and certainly achieves the structure which vibrates the table-like body more appropriately.

Each of the first arm and the second arm may be arranged coaxially with an axis perpendicular to the pedestal, and may be constructed rotatable about the axis independently from the pedestal. Since base parts of the two arms are arranged coaxially, the two arms can be controlled with high precision without a delay, by setting the origin of a robot coordinate system at the position along the common axis.

The imaging unit may image after the vibrating operation of the table-like body. Thus, the image for recognition of the position of the workpiece is captured after the flattening work of the workpiece by vibrating the table-like body. Therefore, the position of the workpiece is efficiently and easily recognized also by using the two-dimensional pattern matching based on the two-dimensional image.

The robot may include a work extracting part configured to take out one workpiece from at least one workpiece placed on the table-like body while the work extracting part is provided to the first hand part. Thus, the flattening work of the workpiece and the take-out work of the workpiece can be achieved by a single robot.

The robot may include a work feeding part configured to take out at least one workpiece from a given work accommodating container where the plurality of the workpieces are accommodated, and place the at least one workpiece on the placement surface of the workpiece in the table-like body, while the work feeding part is provided to the first hand part. Thus, the flattening work of the workpiece and the placing work of the workpiece to the table-like body can be achieved by a single robot.

According to another aspect of the present disclosure, a method of controlling a robot including a first arm having a first hand part provided to a tip end of the first arm, and at least one joint shaft provided between a pedestal and the first hand part is provided. The method includes attaching to the first hand part a first acting part configured to contact a given table-like body on which a plurality of workpieces are able to be placed, vibrating the table-like body by controlling the first arm so that the first acting part acts on the table-like body, imaging a placement surface of the workpiece in the table-like body by an imaging unit configured to image the placement surface two-dimensionally in a perpendicular direction to the placement surface, and recognizing a position of the workpiece by performing a two-dimensional pattern matching based on an image two-dimensionally captured by the imaging unit.

The purpose of the present disclosure, other purposes, features, and advantages will be apparent from the detailed description of the following suitable embodiment with reference to the accompanying drawings.

Effect of the Disclosure

The present disclosure is constructed as described above, and has such an effect that the take-out work of the workpiece is easily achievable, without arranging the jig and/or instrument for exclusive use, and without providing an advanced visual recognition system and performing the complicated control.

MODES FOR CARRYING OUT THE DISCLOSURE

Figure 1:
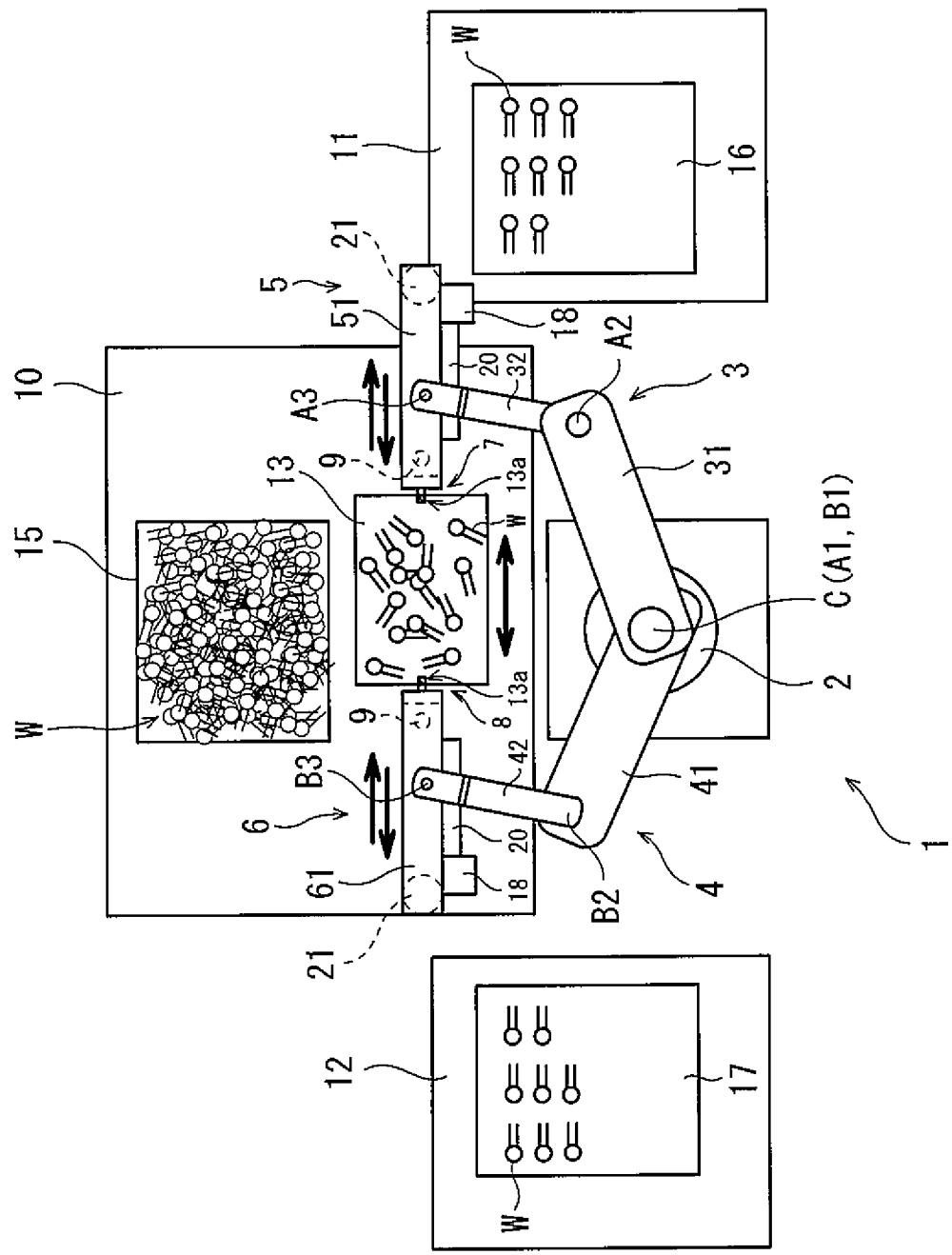
FIG. 1 is a plan view schematically illustrating an outline structure of a robot according to one embodiment of the present disclosure.

Hereinafter, one embodiment of the present disclosure is described with reference to the accompanying drawings. Note that, below, the same reference characters are assigned to the same or corresponding components throughout the figures to omit redundant description.

Figure 2:
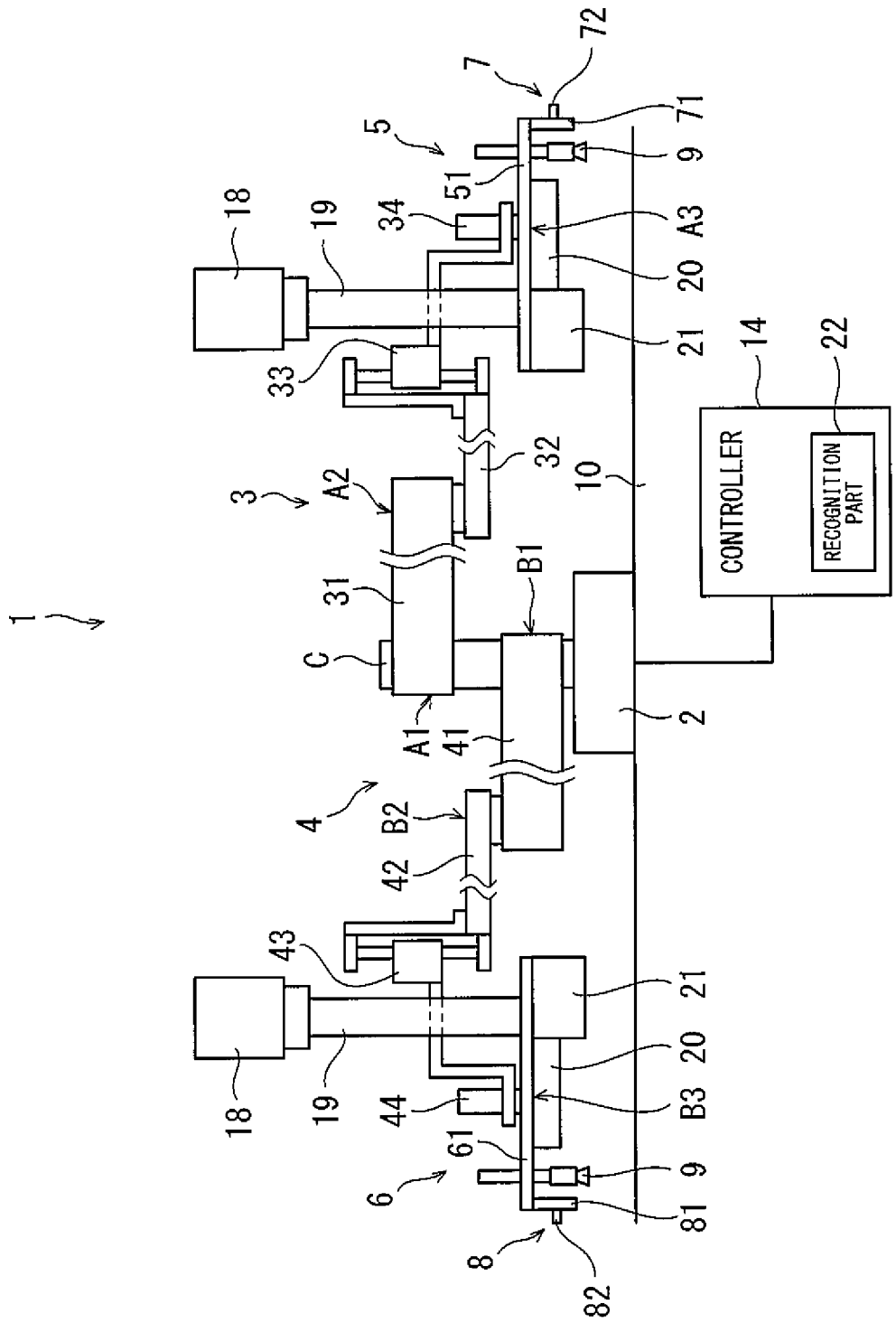
FIG. 2 is a side view of the robot illustrated in FIG. 1.

FIG. 1 is a plan view schematically illustrating an outline structure of a robot according to one embodiment of the present disclosure. Moreover, FIG. 2 is a side view of the robot illustrated in FIG. 1. As illustrated in FIGS. 1 and 2, a robot 1 of this embodiment is constructed as a dual-arm robot in which two arms (a first arm 3 and a second arm 4) are provided to a pedestal 2. The first arm 3 is provided at a tip-end part thereof with a first hand part 5, and has at least one joint shaft (in this embodiment, three joint shafts A1, A2, and A3) between the pedestal 2 and the first hand part 5. Similarly, the second arm 4 is provided at a tip-end part thereof with a second hand part 6, and has at least one joint shaft (in this embodiment, three joint shafts B1, B2, and B3) between the pedestal 2 and the second hand part 6.

A workbench 10 is provided in front of the pedestal 2. A given table-like body 13 where a plurality of workpieces W can be placed is placed on the workbench 10 on the side closer to the pedestal 2. The table-like body 13 serves as a table where the workpieces W, such as electronic components, are placed on an upper surface thereof (i.e., the upper surface serves as a placement surface), and a flattening (described later) is carried out. A given work accommodating container 15 in which the plurality of workpieces W are accommodated is placed on the workbench 10 on the opposite side from the pedestal 2 with respect to the table-like body 13. Moreover, workbenches 11 and 12 are also provided on both sides of the pedestal 2, respectively. Arrangement trays 16 and 17, where the workpieces W taken out from the table-like body 13 are arranged, are placed on the workbenches 11 and 12, respectively. The robot 1 of this embodiment is constructed so that it places at least one workpiece W on the placement surface of the table-like body 13 from the work accommodating container 15, and performs a bin picking work in which one workpiece W is taken out from at least one workpiece W placed on the placement surface of the table-like body 13, and is arranged on the arrangement tray 16 or 17.

The joint shaft A1 is constructed as a shaft perpendicular to an upper surface of the pedestal 2, and the first arm 3 is constructed rotatable around the joint shaft A1. The joint shaft B1 is also constructed as a shaft perpendicular to the upper surface (horizontal surface) of the pedestal 2, and the second arm 4 is constructed rotatable around the joint shaft B1. The joint shaft A1 and the joint shaft B1 are arranged coaxially (constructed as a rotational shaft C), and each of the first arm 3 and the second arm 4 is constructed independently rotatable around the rotational shaft C with respect to the pedestal 2. Since the base parts of the two arms 3 and 4 are arranged coaxially, the two arms 3 and 4 can be taught similarly by setting the origin of a robot coordinate system at the position along the common axis to control the two arms 3 and 4 with high precision without a delay.

Further, other joint shafts A2 and B2 are also constructed as shafts perpendicular to the horizontal surface. Thus, if heights of hoisting parts 33 and 43 (described later) are the same, it is constructed so that the tip-end part of each of the arms 3 and 4 moves along a plane parallel to the horizontal surface. That is, in this embodiment, the robot 1 is constructed as a SCARA robot having coaxial dual arms.

The first arm 3 includes a first member 31 provided between the joint shaft A1 and the joint shaft A2, and a second member 32 provided between the joint shaft A2 and the joint shaft A3. A tip-end part of the second member 32 is provided with the hoisting part 33 which moves the first hand part 5 in height directions (axial directions of the rotational shaft C). The hoisting part 33 may be operated pneumatically, for example, by an air cylinder, or may be electrically driven, for example, by a motor. In the hoisting part 33 which is electrically driven, the height of the hand part can be finely adjusted by carrying out a servo control of the motor. An actuator 34 comprised of an electric motor etc. for rotating the joint shaft A3 is provided to a tip-end part of the hoisting part 33.

Similarly, the second arm 4 includes a first member 41 provided between the joint shaft B1 and the joint shaft B2, a second member 42 provided between the joint shaft B2 and the second hand part 6, the hoisting part 43 which moves the second hand part 6 in the height directions, and an actuator 44 for rotating the joint shaft B3.

A first acting part 7 which contacts with the table-like body 13 is attached to the first hand part 5. Further, the first hand part 5 has an attachment member 51 to which the first acting part 7 is attached. The attachment member 51 is formed in a bar shape extending horizontally, and is attached to a rotational shaft of the actuator 34 of the first arm 3 (i.e., the joint shaft A3) at a central part thereof in the longitudinal directions. The attachment member 51 is constructed rotatable about an axis perpendicular to the horizontal surface by the actuator 34 comprised of an electric motor etc. The first acting part 7 is attached to one end part of the attachment member 51 in the longitudinal directions.

Similar to the first hand part 5, the second hand part 6 has an attachment member 61 rotatably attached to an output shaft of the actuator 44 of the second arm 4 (i.e., the joint shaft B3), and a second acting part 8 is attached to one end part of the attachment member 61 in the longitudinal directions. The second acting part 8 is also constructed contactable with the table-like body 13.

The first acting part 7 includes a contact surface 71 which is perpendicular to the horizontal surface, and a protrusion 72 protruding from the contact surface 71 in a direction perpendicular to the contact surface 71. Similarly, the second acting part 8 is also provided with a contact surface 81 and a protrusion 82. On the other hand, recesses (bore parts) 13a into which the respective protrusions 72 and 82 are insertable are formed at given positions in side surfaces of the table-like body 13. Therefore, in a state in which the contact surfaces 71 and 81 of the acting parts 7 and 8 are located almost in parallel with the side surfaces of the table-like body 13, the protrusions 72 and 82 of the acting parts 7 and 8 are inserted into the corresponding recesses 13a of the table-like body 13 to prevent a positional offset of the acting parts 7 and 8 with respect to the table-like body 13 during a vibrating operation (described below) in which the two acting parts 7 and 8 vibrate the table-like body 13. That is, the protrusions 72 and 82 of the acting parts 7 and 8 and the recesses 13a of the table-like body 13 function as a guide mechanism during the vibrating operation. The contact surfaces 71 and 81 extend downwardly at one end parts of the attachment members 51 and 61 in the longitudinal directions.

The robot 1 includes a controller 14 which controls each of the first arm 3 and the second arm 4. The controller 14 includes a CPU, such as a micro controller, and a memory which stores control program(s). The controller 14 carries out the servo control of servo motors (not illustrated) for rotationally driving the respective joint shafts A1, A2, A3, B1, B2, and B3 of the robot 1 to move the first hand part 5 and the second hand part 6 to arbitrary positions along arbitrary paths.

In this embodiment, a work extracting part 9 which takes out one of the at least one workpiece W placed on the table-like body 13 is attached to the first hand part 5. The work extracting part 9 is provided between the joint shaft A3 of the attachment member 51 and the first acting part 7. The work extracting part 9 is, for example, an adsorption mechanism in which an adsorption part is provided at a position extended downwardly from the attachment member 51. For example, as the adsorption mechanism, a vacuum adsorption mechanism which adsorbs the workpiece W to the adsorption part by vacuuming air inside the adsorption part, such as an adsorption pad, or a flow-rate adsorption mechanism which adsorbs the workpiece W to the adsorption part by constantly producing a flow of air in a sucking direction of the workpiece W, may be adopted. The flow-rate adsorption mechanism may adopt a structure of the adsorption part in which, for example, a workpiece inflow preventing mechanism of a mesh at, for example, a tip end of an air intake hose is provided to adsorb the workpiece W to the workpiece inflow preventing mechanism when the workpiece W is sucked with air by the air intake hose. However, since the work extracting part 9 is required to take out one workpiece W appropriately, it is desirable to be a suitable vacuum adsorption mechanism to adsorb one workpiece W.

Similarly, the work extracting part 9 is also attached to the second hand part 6. The work extracting part 9 of the second hand 6 is provided between the joint shaft B3 of the attachment member 61 and the second acting part 8.

Further, the robot 1 includes imaging units 18 which two-dimensionally image the placement surface for the workpiece W of the table-like body 13 in a vertical direction of the placement surface. The imaging unit 18 may adopt a known camera etc. used for pattern matching. The imaging unit 18 is provided to the first hand part 5. An upwardly-extending stay 19 is attached to near the other end part of the attachment member 51 in the longitudinal directions (the end part on the opposite side from the first acting part 7 with respect to the joint shaft A3). The imaging unit 18 is attached to an upper end part of the stay 19 in a state where its photo-receiving part is oriented downwardly. Moreover, an imaging light 20 which emits light to the placement surface for the workpiece W of the table-like body 13 is provided to the attachment member 51. In this embodiment, the imaging unit 18 and the imaging light 20 are similarly provided to the second hand part 6.

Further, the first hand part 5 is provided with a work feeding part 21 which takes out at least one workpiece W from the work accommodating container 15 and places it on the placement surface for the workpiece W of the table-like body 13. The work feeding part 21 may adopt an adsorption mechanism in which an adsorption part is provided at a position extended downwardly from the attachment member 51, similar to the work extracting part 9. However, since the work feeding part 21 is more efficient if it adsorbs a comparatively large number of workpieces W, it is desirable to be a flow-rate adsorption mechanism suitable for adsorbing the comparatively large number of workpieces W.

In this embodiment, the controller 14 is set up so that it can grasp the position of each joint shaft of the robot 1 in a base coordinate system which is a rectangular coordinate system where the pedestal 2 is the origin, and a tool coordinate system which is a rectangular coordinate system where the first hand part 5 or the second hand part 6 is the origin. The robot 1 is configured so that the controller 14 is settable by inputs of positional information on the table-like body 13, the work accommodating container 15, the arrangement trays 16 and 17 being arranged, dimensional information on the table-like body 13 and the workpiece W, shape information on the workpiece W, intensity of the vibrating operation (cycle or amplitude), vibrating period of time, etc. Each inputted setting information is stored in the memory of the controller 14. The controller 14 also performs controls of the work extracting parts 9, the work feeding parts 21, and the imaging units 18. Further, the controller 14 also functions as a recognition part 22 which recognizes the position of the workpiece W on the placement surface by performing the two-dimensional pattern matching based on the image two-dimensionally captured by the imaging unit 18. Note that, alternatively, for example, the recognition part 22 may be provided separately from the controller 14 by connecting an external computer which functions as the recognition part 22 with the controller 14 of the robot 1, etc.

Figure 3:
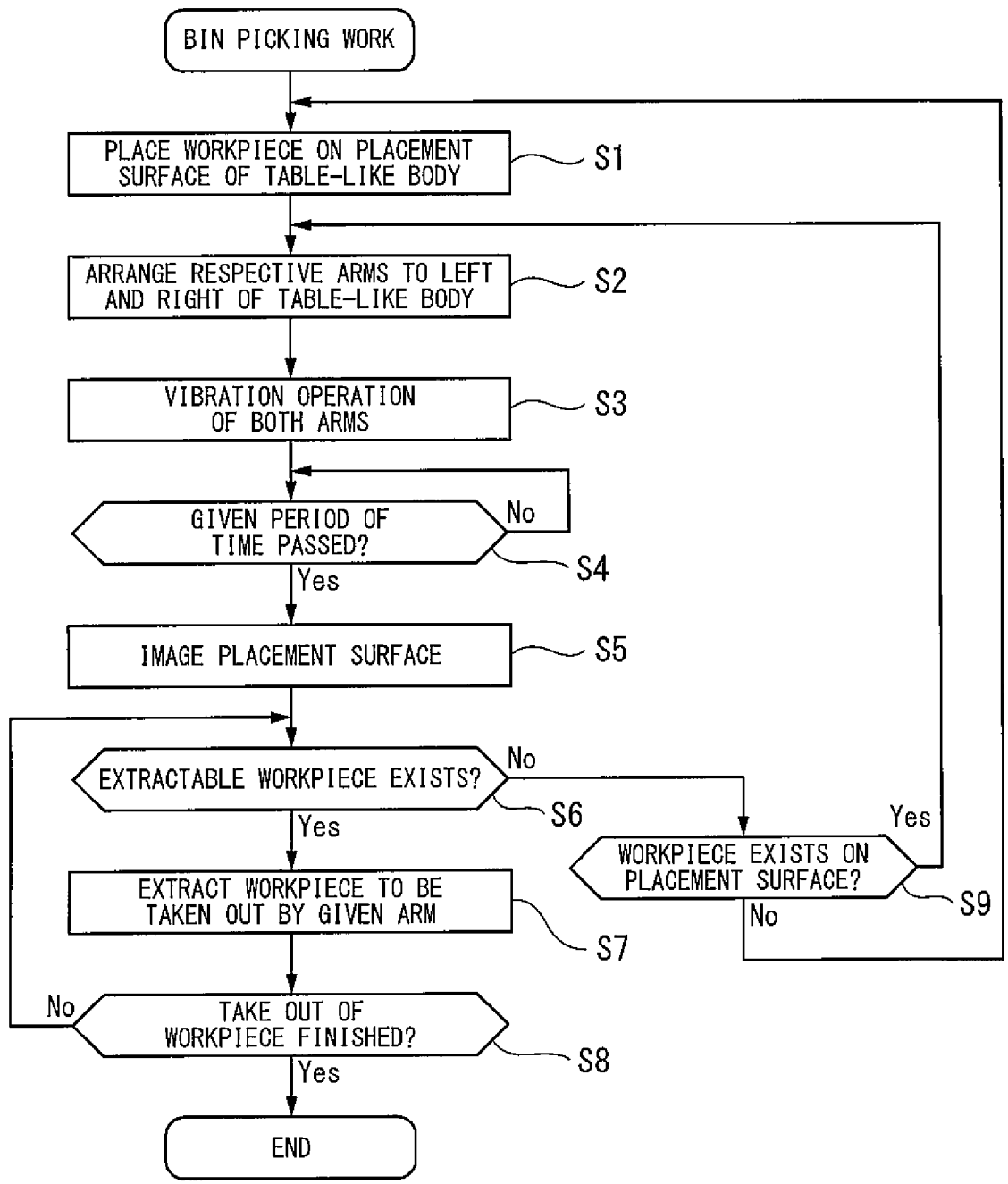
FIG. 3 is a flowchart illustrating a flow of processing of a bin picking work in this embodiment.

Below, a control operation of the robot 1 when the robot 1 performs the bin picking work in which the robot 1 places the workpiece W on the placement surface of the table-like body 13 from the work accommodating container 15, takes a given number of workpieces W out of the plurality of workpieces W placed on the placement surface of the table-like body 13, and arranges the workpieces W on the arrangement trays 16 and 17, is described. FIG. 3 is a flowchart illustrating a flow of processing of the bin picking work in this embodiment.

Figure 4:
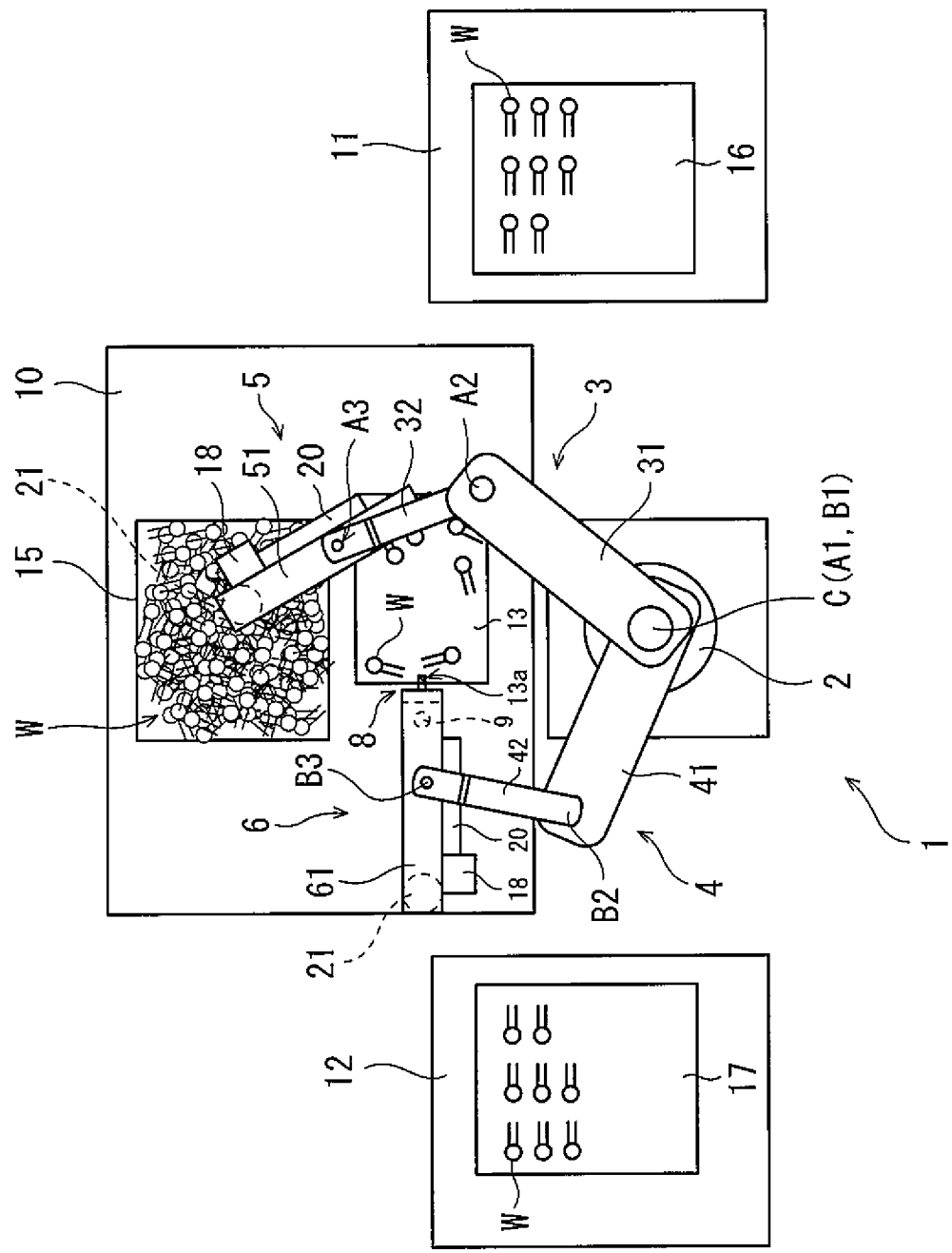
FIG. 4 is a plan view illustrating a process in which the robot illustrated in FIG. 1 places at least one workpiece on a placement surface of a table-like body from a work accommodating container.

In this embodiment, the controller 14 first controls the work feeding part 21 of the first hand 5 to place at least one workpiece W (e.g., about five workpieces) from the work accommodating container 15 on the placement surface of the table-like body 13 (Step S1). FIG. 4 is a plan view illustrating a process in which the robot illustrated in FIG. 1 places at least one workpiece from the work accommodating container on the placement surface of the table-like body. As illustrated in FIG. 4, the controller 14 arranges the work feeding part 21 of the first hand 5 at a position in the work accommodating container 15, and performs an acquisition operation (if it is the adsorption mechanism, an adsorption operation) of the workpiece W by the work feeding part 21. Then, the controller 14 carries out a motion control of the first arm 3 after the workpiece W is acquired by the work feeding part 21 to arrange the work feeding part 21 on the placement surface of the table-like body 13. The controller 14 cancels the acquisition operation of the workpiece W by the work feeding part 21 in this state, and places the workpiece W on the placement surface of the table-like body 13.

The controller 14 controls the arms 3 and 4 to arrange them to left and right of the table-like body 13, respectively (Step S2). Thus, the first hand part 5 and the second hand part 6 are located at vibrating operation starting positions to the table-like body 13. Note that, at Step S1, since there is no required operation for the second arm 4 and the second hand part 6, the controller 14 may control the second hand part 6 to locate it at the vibrating operation starting position to the table-like body 13 beforehand at Step S1, and to maintain this state, as illustrated in FIG. 4. As illustrated in FIG. 1, the vibrating operation starting positions are positions at which the protrusions 72 and 82 of the acting parts 7 and 8 described above are inserted into the corresponding recesses 13a of the table-like body 13.

If the initial position of the table-like body 13 is determined beforehand, the positions of the acting parts 7 and 8 can also be determined beforehand Thus, the controller 14 carries out the motion control of the arms 3 and 4 to the predetermined positions. Alternatively, the controller 14 may image the table-like body 13 by the imaging unit 18, together with a marker (not illustrated) on the workbench 10 of which coordinates are known, calculate the position of the table-like body 13 based on a spatial relationship between the table-like body 13 and the marker, and carry out the motion control of the arms 3 and 4 to the vibrating operation starting positions of the acting parts 7 and 8 which are determined based on the calculated position of the table-like body 13.

Next, the controller 14 controls the first arm 3 to cause the first acting part 7 act on the table-like body 13 to perform the vibrating operation which vibrates the table-like body 13 (Step S3). Further, the controller 14 controls the second arm 4 to cause the second acting part 8 act on the table-like body 13. That is, as illustrated in FIG. 1, the controller 14 controls the first arm 3 and the second arm 4 in a state where the table-like body 13 is located between the first acting part 7 and the second acting part 8, so that the first arm 3 and the second arm 4 cooperate, to vibrate the table-like body 13.

More specifically, the controller 14 controls the first acting part 7 and the second acting part 8 to move the first acting part 7 and the second acting part 8 in given directions (left-and-right directions which are opposing directions of the acting parts 7 and 8 in the example of FIG. 1) with a given amplitude and at a given cycle, while maintaining a constant distance between the first acting part 7 and the second acting part 8 (a length obtained by adding a given margin to the width of the table-like body 13). Here, the positional controls of the first arm 3 and the second arm 4 may be carried out, or the first arm 3 may be used as a master arm and the second arm 4 as a slave arm, and the positional control of the first arm 3 may be carried out and the second arm 4 may be controlled to follow the motion of the first arm 3 so that the distance between the first acting part 7 and the second acting part 8 is constant. Thus, the table-like body 13 vibrates so as to reciprocate in the left-and-right directions, while sliding on the workbench 10.

Alternatively to this embodiment, the controller 14 may cause the first acting part 7 and the second acting part 8 to grip the table-like body 13. That is, the margin described above may be 0. Thus, the controller 14 may perform the vibrating operation while lifting the table-like body 13. In this case, the first acting part 7 and the second acting part 8 may have a shape to grip the table-like body 13. Moreover, the vibrating direction is not limited to the left-and-right directions but may be front-and-rear directions, or may be horizontal directions including the front-and-rear directions and the left-and-right directions, or may be the vertical directions (the height directions), or may be three-dimensional directions including the vertical direction and the horizontal directions. Further, additionally and alternatively, the table-like body 13 may be swung about a given swing axis perpendicular to the horizontal surface or a vertical surface.

According to the structure, since the table-like body 13 where the workpieces W are placed is vibrated by the first acting part 7 provided to the first hand part 5 and the second acting part 8 provided to the second hand part 6, the flattening work of the workpieces W on the table-like body 13 can be achieved without arranging a jig or instrument for exclusive use. In addition, the table-like body 13 located between the first acting part 7 and the second acting part 8 is vibrated by the cooperation of the first arm 3 and the second arm 4. Therefore, the cooperation of the two arms 3 and 4 easily and certainly achieves the structure which vibrates the table-like body 13 more appropriately.

Figure 5:
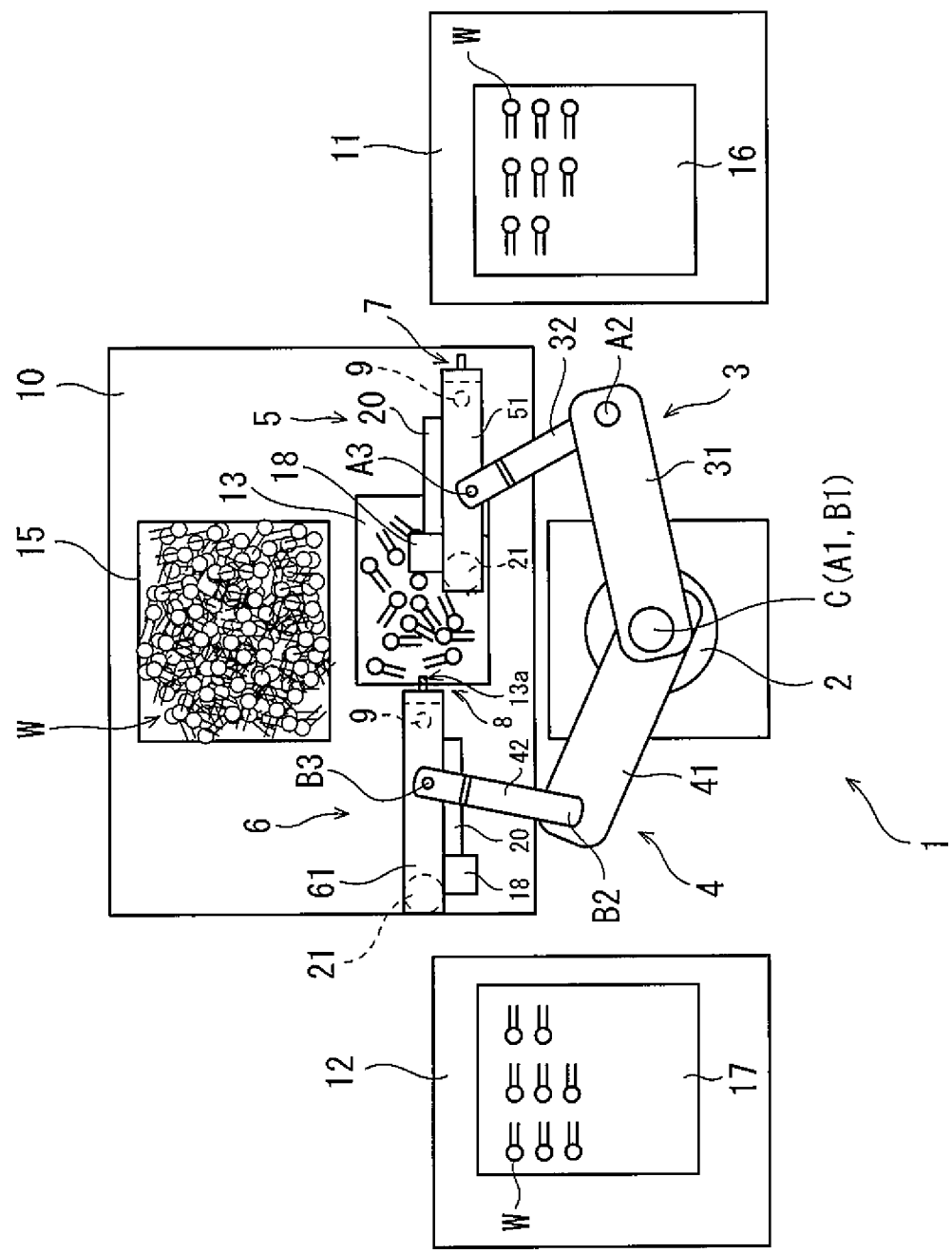
FIG. 5 is a plan view illustrating a process in which the robot illustrated in FIG. 1 images the placement surface of the table-like body by using an imaging unit.

The controller 14 has a built-in timer (not illustrated) and counts an operating period of time of the vibrating operation. The controller 14 determines whether a given period of time has passed after the vibrating operation started (Step S4). If the controller 14 determines that the given period of time has passed (Yes at Step S4), it then stops the vibrating operation and images the placement surface for the workpiece W of the table-like body 13 by using the imaging unit 18 (Step S5). FIG. 5 is a plan view illustrating a process in which the robot illustrated in FIG. 1 images the placement surface of the table-like body by using the imaging unit. As illustrated in FIG. 5, the first arm 3 is operated so that the protrusion 72 of the first acting part 7 is drawn out from the corresponding recess 13a of the table-like body 13. Then, the controller 14 rotates the first hand part 5 about 180 degrees around the joint shaft A3 to arrange above the table-like body 13 the imaging unit 18 which is located at the opposite end from the end where the first acting part 7 in the attachment member 51 of the first hand part 5 is provided. At this position, the controller 14 images the placement surface of the table-like body 13 by using the imaging unit 18. Here, the controller 14 turns on the imaging light 20 provided to the first hand part 5.

The captured two-dimensional image is sent to the recognition part 22. The recognition part 22 reads out the shape data of the workpiece W stored beforehand, and performs the two-dimensional pattern matching of the image two-dimensionally captured by the imaging unit 18 based on the shape of the workpiece W. As a result of the pattern matching, if the shape of the workpiece W is extracted from the captured image, the recognition part 22 identifies coordinates and posture (orientation) of the extracted workpiece W. The coordinates and posture of the workpiece W are sent to the controller 14.

After the pattern matching is finished, the controller 14 determines the existence of the coordinates and posture data of the extracted workpiece W (Step S6). That is, the controller 14 determines whether there is a workpiece W at this moment, which does not overlap with other workpieces W on the placement surface of the table-like body 13 and which is able be taken out. If there is a workpiece W on the placement surface, which is able be taken out (Yes at Step S6), the controller 14 takes out the workpiece W, which is able be taken out, by using the work extracting part 9 provided to the first hand part 5 (Step S7). If there are a plurality of workpieces W which are able be taken out, the workpiece W to be taken out is determined based on a given priority.

Figure 6:
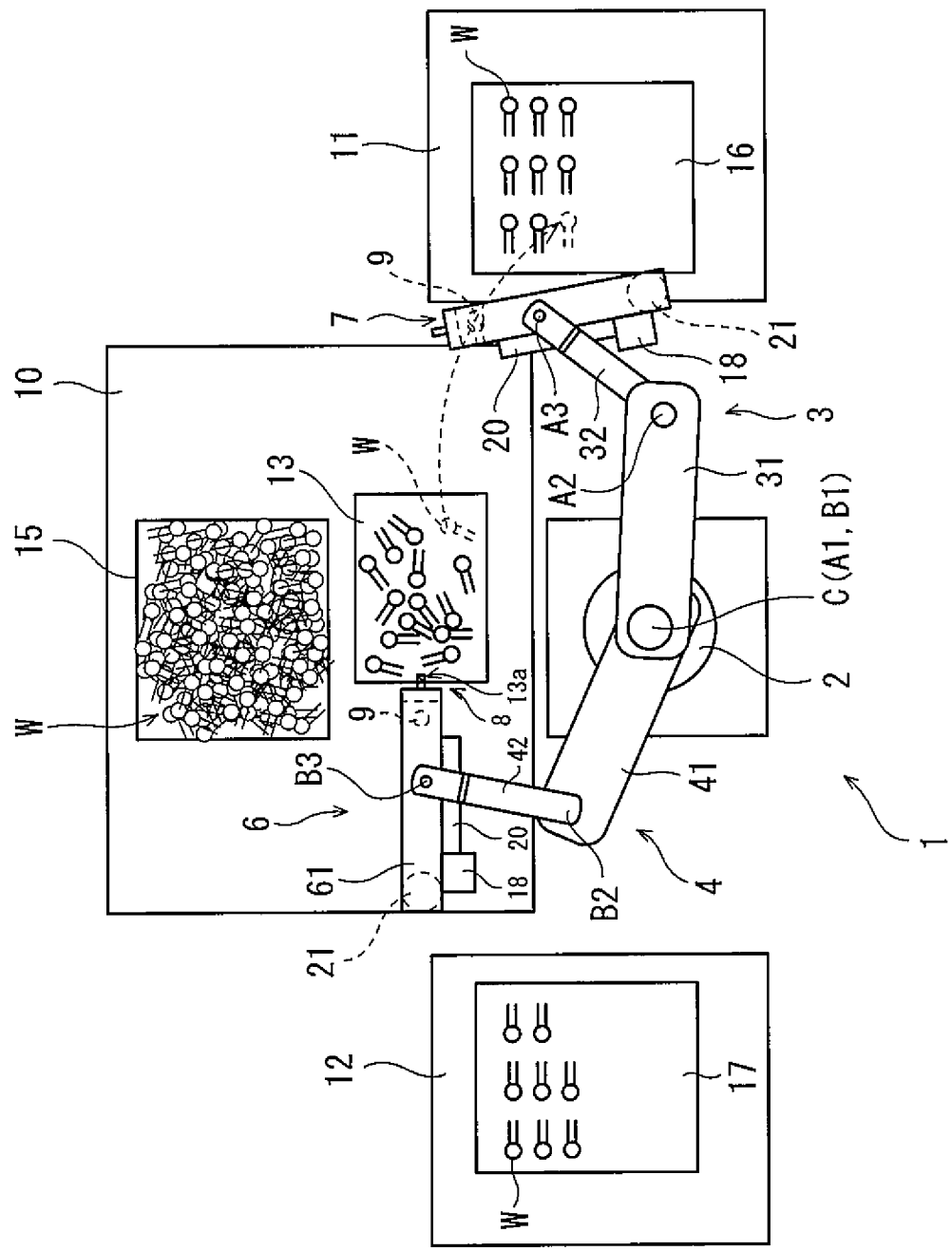
FIG. 6 is a plan view illustrating a process in which the robot illustrated in FIG. 1 takes out the workpiece on the placement surface of the table-like body.

FIG. 6 is a plan view illustrating a process in which the robot illustrated in FIG. 1 takes out the workpiece on the placement surface of the table-like body. The controller 14 reads out the coordinates and posture data of the workpiece W to be taken out, among the workpieces W on the placement surface of the table-like body 13, and based on the data, the controller 14 controls the work extracting part 9 provided to the first hand part 5 so that the work extracting part 9 is located above the workpiece W. The controller 14 performs the acquisition operation (if it is the adsorption mechanism, an adsorption operation) of the workpiece W by the work extracting part 9. Then, as illustrated in FIG. 6, the controller 14 carries out the motion control of the first arm 3 and the first hand part 5 after the workpiece W has been acquired by the work extracting part 9, and arranges the work extracting part 9 at the given position of the right arrangement tray 16 (closer to the first hand part 5) of the workbench 11. In this state, the controller 14 cancels the acquisition operation of the workpiece W by the work extracting part 9, and places the workpiece W on the arrangement tray 16.

For example, the controller 14 counts the number of the workpieces W arranged on the arrangement tray 16. According to an arranging order, arranging coordinates of the workpieces W on the arrangement tray 16 are predefined, and when the controller 14 arranges the next workpiece W on the arrangement tray 16 based on the number of the arranged workpieces W, it carries out the positional control of the first arm 3 based on the arranging coordinates.

The controller 14 determines whether the take-out work of the workpieces W has ended (Step S8). For example, the controller 14 determines whether the arrangeable number of workpieces W is arranged on the arrangement trays 16 and 17. If the controller 14 determines that the take-out work of the workpieces W has been finished (Yes at Step S8), it then ends the series of bin picking works.

If the controller 14 determines that the take-out work of the workpieces W has not been finished (No at Step S8), it again determines whether a workpiece W which is able be taken out exists (Step S6). Here, the determination may be made after the placement surface of the table-like body 13 is again imaged using the imaging unit 18 and the pattern matching is performed.

Alternatively, if the controller 14 determines that there are a plurality of extractable workpieces W as a result of a previous pattern matching, the determination may be made using the result of the pattern matching as it is. That is, the work can be accelerated by determining under an assumption that workpieces W other than the workpiece W taken out during the previous take-out work of the workpiece W have not moved. In this case, a workpiece W of a next lower priority than the workpiece W taken out this time is determined to be a workpiece W to be taken out.

If the controller 14 determines that there is a workpiece W which is able be taken out (Yes at Step S7), it takes out the workpiece W by using the work extracting part 9 similar to the previous time (Step S8). Here, the work extracting part 9 which takes out the workpiece W may be the work extracting part 9 provided to a different hand part from the previous time (in this example, the second hand part 6), and may arrange the extracted workpiece W on the corresponding arrangement tray 17 (left side closer to the second hand part 6). Thus, the workpieces W can be uniformly arranged on the left and right arrangement trays 16 and 17.

If the controller 14 determines that there is no workpiece which is able be taken out (No at Step S6), it then determines whether a workpiece W exists on the placement surface of the table-like body 13 based on the captured image (Step S9). Specifically, the controller 14 makes the determination by determining whether there is any part having a different luminosity value from that of the placement surface of the table-like body 13, within the placement surface of the captured image.

If the controller 14 determines that workpiece W does not exist on the placement surface (No at Step S9), it again performs the work in which the workpiece W is placed on the placement surface of the table-like body 13 (Step S1) and subsequent works. On the other hand, if the controller 14 determines that the workpiece W exists on the placement surface (Yes at Step S9), it again performs the work in which the table-like body 13 is vibrated (Step S2, S3) and subsequent works. Note that, the work extracting part 9 which takes out the workpieces W in the next work may be the work extracting part 9 attached to the hand part 6 or 5 which is different from the hand part 5 or 6 which took out the workpieces W in the previous work, and the workpieces W may be controlled to be arranged on the different arrangement tray 17 or 16 from one of the previous work. Here, in the work in which the placement surface of the table-like body 13 is imaged by the imaging unit 18 (Step S5), the imaging unit 18 provided to the hand part which is the same as the hand part 6 or 5 to which the work extracting part 9 which takes out the workpieces W is provided may be used. Thus, each of the arms 3 and 4 of the robot 1 can efficiently be operated.

As described above, according to the robot 1 in this embodiment, it can easily achieve the take-out work of the workpiece W, without arranging the jig and/or instrument for exclusive use. In addition, in this embodiment, the work feeding parts 21, the imaging units 18, and the work extracting parts 9, as well as the acting parts 7 and 8, are provided to a single robot 1. Thus, the workpiece flattening work (the vibrating operation), the feeding work of the workpieces W to the table-like body 13, the recognition work (the pattern matching) of the workpiece W on the placement surface of the table-like body 13, and the take-out work of the workpiece W can be achieved by a single robot. Therefore, in the work line including the process in which the bin picking work is performed as described above, only such an operation process can be easily replaced from manual labor to the robot 1. Thus, a change, an addition, etc. of a work line is unnecessary. Moreover, since the workpiece W on the placement surface is imaged by the imaging unit 18 and the pattern matching is performed after the overlapping of the workpieces W is eliminated by the flattening work, a sufficient recognition of the workpiece W is possible by the two-dimensional (planar) pattern matching using a single imaging unit 18 (camera), thereby eliminating the necessity of a conventional three-dimensional pattern matching using a plurality of cameras. Therefore, the facility cost is reduced compared with installing the plurality of cameras and performing the three-dimensional pattern matching. In addition, the throughput of the pattern matching is increased, and a complicated control is unnecessary.

As described above, although the embodiment of the present disclosure is described, the present disclosure is not limited to the embodiment described above, and various improvements, changes, and modifications are possible without departing from the spirit of the present disclosure.

For example, in the embodiment described above, although the adsorption mechanism is used as the work extracting part 9, the work extracting part 9 is not limited to the adsorption mechanism but various work extracting parts may be applicable. For example, various work holding structures, such as a gripper mechanism which takes out and moves a workpiece W by gripping the workpiece W, are applicable.

Figure 7:
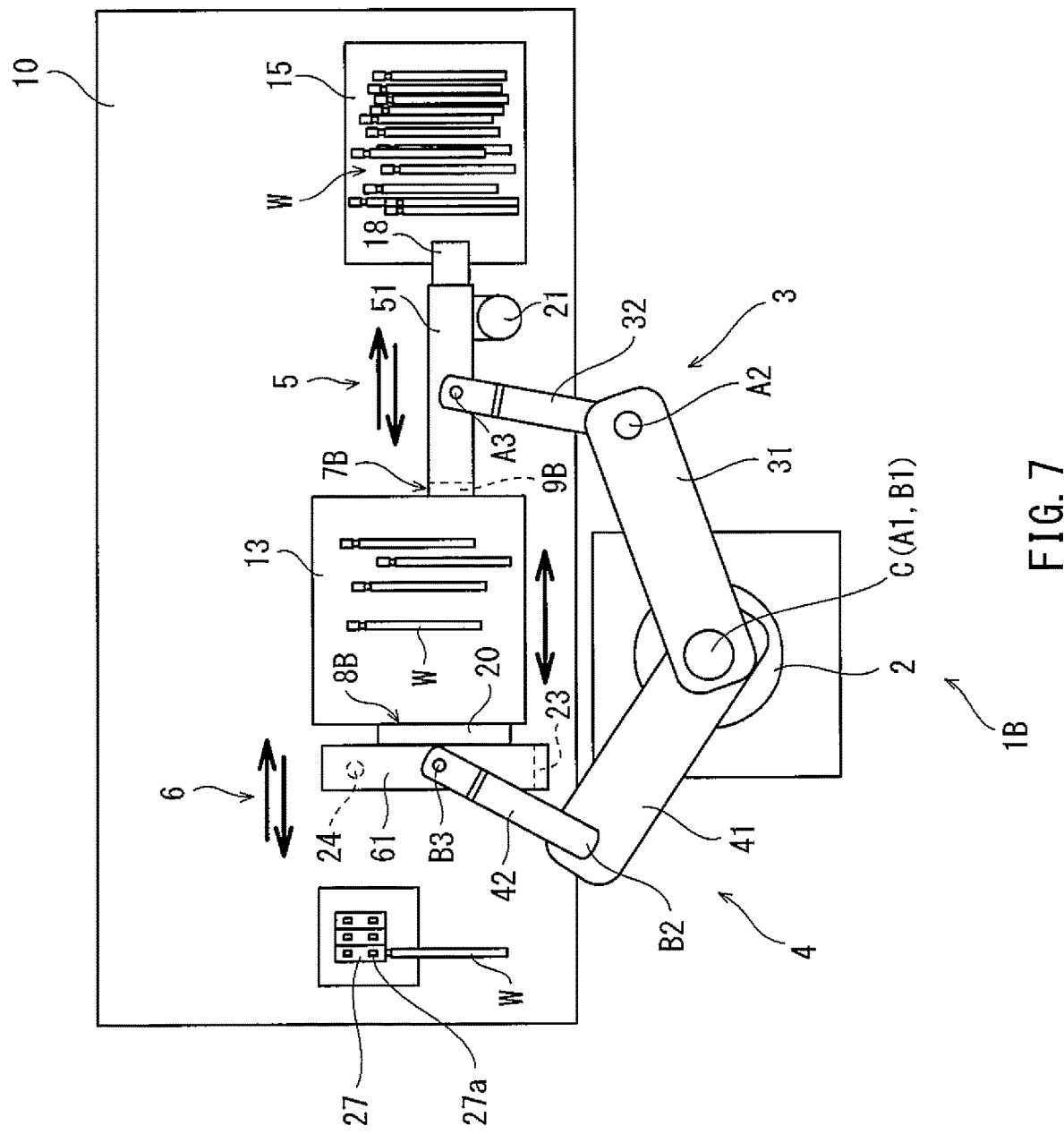
FIG. 7 is a plan view schematically illustrating an outline structure of a robot according to a first modification of the one embodiment of the present disclosure.
Figure 8:
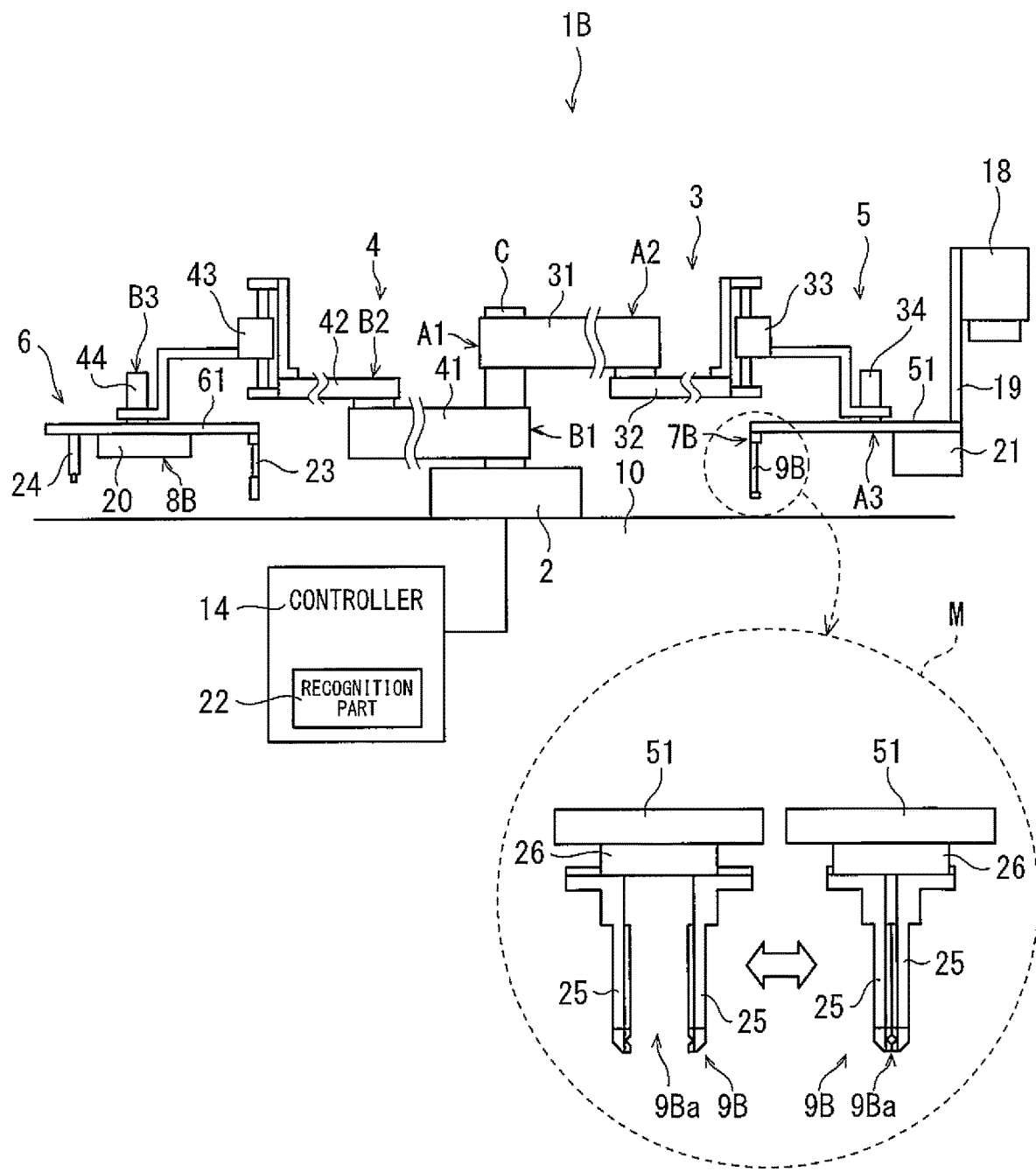
FIG. 8 is a side view of the robot illustrated in FIG. 7.

FIG. 7 is a plan view schematically illustrating an outline structure of a robot according to a first modification of the one embodiment of the present disclosure, and FIG. 8 is a side view of the robot illustrated in FIG. 7. Same reference characters are assigned to the same structures as those of the embodiment described above to omit description thereof. The robot 1B of this modification is constructed so as to feed a bar-shaped workpiece W, such as a wiring cable, accommodated in the work accommodating container 15 to the placement surface on the table-like body 13, vibrate the table-like body 13 to flatten the workpieces W on the placement surface, take out a workpiece W from the placement surface by using the work extracting part 9 provided with the gripper mechanism, and perform a work to connect the workpiece W to a connector 27 placed on the workbench 10.

In this modification, the attachment member 51 of the first hand 5 is provided at one end part in the longitudinal directions with a work extracting part 9B, and the imaging unit 18 is provided at the other end part in the longitudinal directions through the stay 19. In the work extracting part 9B, one end part side (outward) in the longitudinal directions of the attachment member 51 is formed in a planar fashion which constitutes a first acting part 7B. The work feeding part 21 is provided to the attachment member 51 between the joint shaft A3 and the imaging unit 18. In addition, the attachment member 61 of the second hand part 6 is provided at one end part in the longitudinal directions with a gripper mechanism 23 which grips a workpiece W, and a connector handler 24 for connecting the workpiece W to the connector 27 is provided to the other end part in the longitudinal directions. The imaging light 20 is provided to the side of the attachment member 61. The imaging light 20 has a side surface along the longitudinal directions of the attachment member 61 which is planar which constitutes a second acting part 8B.

Below, a control flow is described briefly. The control flow in this modification is basically the same as that of the structure of FIG. 1. Below, only the motion of the robot 1B based on a control instruction from the controller 14 is described. First, the work feeding part 21 attached to the first hand part 5 takes out a workpiece W from the work accommodating container 15, and places it on the placement surface on the table-like body 13. Then, the side surface of the work extracting part 9B which is the first acting part 7B contacts one side surface of the table-like body 13, and the side surface of the imaging light 20 of the second acting part 8B contacts the opposite side surface of the table-like body 13. In the state, the table-like body 13 is vibrated by cooperating the first arm 3 and the second arm 4 (reciprocating in the opposing directions of the acting parts 7B and 8B). After the vibrating operation, the imaging unit 18 attached to the first hand part 5 images the placement surface, while the imaging light 20 attached to the second hand part 6 emits light to the placement surface. The recognition part 22 performs the two-dimensional pattern matching based on the two-dimensionally captured image.

The work extracting part 9B attached to the first hand part 5 grips a workpiece W based on the result of pattern matching. As illustrated by a partially-enlarged section M in FIG. 8, the work extracting part 9B includes a base portion 26 attached to a lower surface of the attachment member 51, and a pair of pawl portions 25 which extend downwardly from the base portion 26 and are openable and closable with respect to the base portion 26. Note that, the partially-enlarged section M indicates an open state and a closed state of the work extracting part 9B seen from one end part side in the longitudinal directions of the attachment member 51. Lower sections of the pair of pawl portions 25 are constructed as a grip part 9Ba which grips the workpiece W. The gripper mechanism 23 provided to the second hand part 6 also has similar structure.

The workpiece W in this modification is a wiring cable of which a jacket part is notched in one end part. The gripper mechanism 23 provided to the second hand part 6 grips one end side of the workpiece W with respect to the notch of the workpiece W (a side where the jacket part is axially shorter with respect to the notch), while the work extracting part 9B provided to the first hand part 5 grips the other end side of the workpiece W with respect to the notch of the workpiece W (a side where the jacket part is axially longer with respect to the notch). Then, the work extracting part 9B and the gripper mechanism 23 move in their separating directions in the longitudinal directions of the workpiece W, the jacket part gripped by the gripper mechanism 23 is removed from the workpiece W and a conducting wire of this part is stripped.

Then, the gripper mechanism 23 discards the jacket part gripped by the gripper mechanism 23 onto a given tray (not illustrated). The first arm 3 moves the work extracting part 9B so that the one end side of the workpiece W (a conducting-wire side) gripped by the work extracting part 9B is oriented toward a conducting-wire insertion part of the connector 27.

The connector 27 in this modification has a push-button structure 27a for securing the wiring cable in its upper part. The push-button structure 27a is constructed so that the wiring cable is insertable into and removable from the conducting-wire insertion part of the connector 27 by being in a pushed state (a button is pushed) and the wiring cable inserted into the conducting-wire insertion part of the connector 27 is irremovable by being in a released state (the button is not pushed). The connector handler 24 provided to the second hand part 6 is formed as a bar-shaped member extending downwardly from a lower surface of the attachment member 61. The second arm 4 arranges the connector handler 24 on the push-button structure 27a of the connector 27 into which the workpiece W gripped by the work extracting part 9B is to be inserted.

While the connector handler 24 is pushing the push-button structure 27a, the first arm 3 moves so that the workpiece W gripped by the work extracting part 9B is inserted into the corresponding conducting-wire insertion part of the connector 27. While the conducting-wire part of the workpiece W is inserted in the conducting-wire insertion part of the connector 27, the second arm 4 moves so as to cancel the pushed state of the push-button structure 27a by the connector handler 24. Thus, the workpiece W is fixed in a state where it is inserted in the connector 27.

Thus, also in the robot 1 in this modification, the take-out work of the workpiece W can easily be achieved, without arranging the jig and/or instrument for exclusive use.

Note that, in the embodiment described above (the example of FIG. 1), although the structure in which the imaging unit 18 and the work feeding part 21 are provided to each of the hand parts 5 and 6 is illustrated, the imaging unit 18 and the work feeding part 21 may be provided to one of the two hand parts 5 and 6 like the modification illustrated in FIG. 7. Moreover, any structure of the imaging unit 18, the work feeding part 21, the imaging light 20, the work extracting parts 9 and 9B, the gripper mechanism 23, etc. may be attached to the two hand parts 5 and 6 in a freely combined manner. For example, the work extracting parts 9 and 9B may be provided to the first hand part 5, and the imaging unit 18 and the work feeding part 21 may be provided to the second hand part 6. The imaging unit 18 may not be attached to a movable part of the robot 1 (the arms 3 and 4, and the hand parts 5 and 6), but may be attached to a fixed position, such as the pedestal 2. The feeding of the workpieces W to the table-like body 13 may be performed manually, or a part feeding device or another robot, and the robot 1 may be structured so as not to be provided with the work feeding part 21.

Moreover, in the embodiment described above, although the structure in which the two arms 3 and 4 are coaxially arranged with the rotational shaft C is described, they are not necessarily coaxially arranged. Moreover, the present disclosure is also applicable to a robot having three or more arms.

Moreover, in the embodiment, although the SCARA robot (horizontal articulated robot) in which the joint shafts of the two arms 3 and 4 are all perpendicular or vertical to the horizontal surface is described, but the present disclosure is also applicable to a robot having a plurality of arms which are three-dimensionally controllable of the positions of hand parts, like one used in 6-axis articulated robot etc.

Figure 9A:
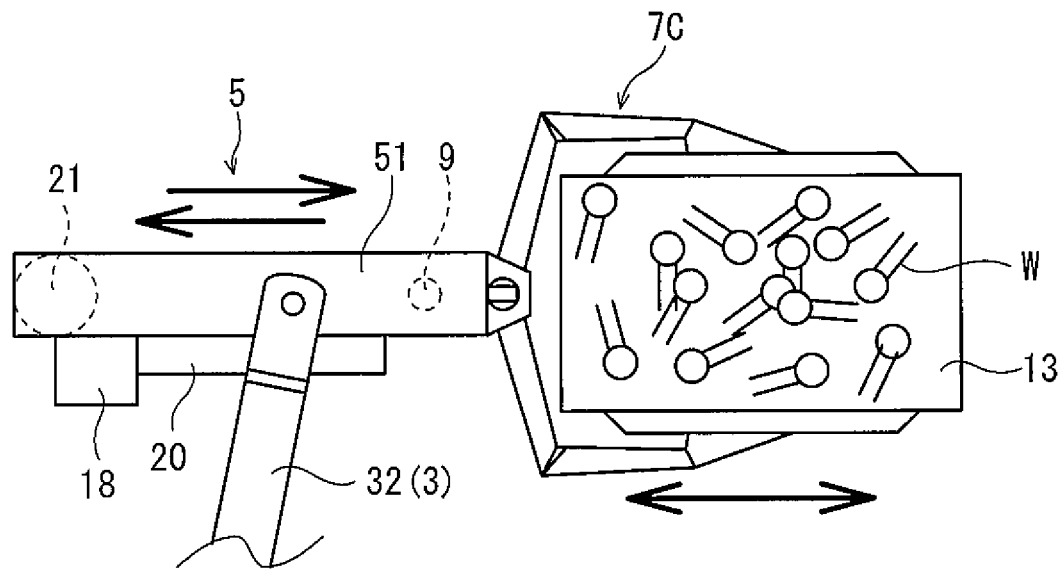
FIG. 9A is a partial plan view illustrating a structure near a hand part when applying the present disclosure to a robot having one arm.
Figure 9B:
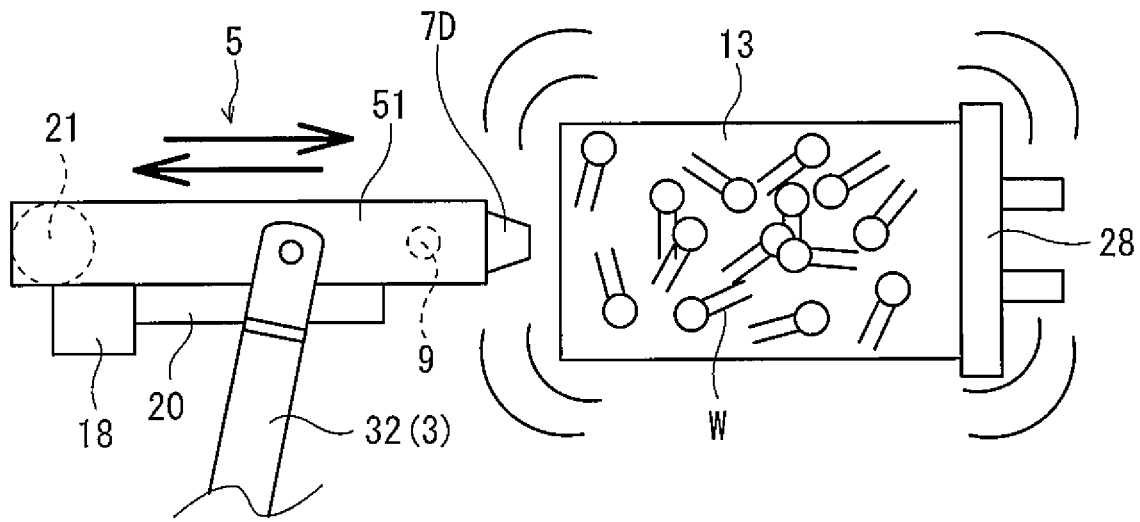
FIG. 9B is a partial plan view illustrating another structure near a hand part when applying the present disclosure to a robot having one arm.

Further, the present disclosure is also applicable to a robot having only one arm. FIGS. 9A and 9B are partial plan views illustrating a structure near a hand part when applying the present disclosure to the robot having one arm (a first arm). FIG. 9A illustrates one example in which a hand part is provided with a gripper mechanism as an acting part, and FIG. 9B illustrates one example in which a hand part is provided with a tapping mechanism as the acting part.

In the example illustrated in FIG. 9A, the gripper mechanism which grips side surfaces of the table-like body 13 is provided as a (first) acting part 7C, in one end part in longitudinal directions of an attachment member 51 of a (first) hand 5. A controller 14 carries out a motion control of the (first) arm 3 so that the table-like body 13 reciprocates in left-and-right directions, while the table-like body 13 is gripped by such an acting part 7C.

On the other hand, in the example illustrated in FIG. 9B, the tapping mechanism which taps a side surface of the table-like body 13 is provided as a (first) acting part 7D, in one end part in the longitudinal directions of the attachment member 51 of the (first) hand 5. In this example, a wall 28 is formed on a surface which is opposite from the side surface tapped by the tapping mechanism for the table-like body 13, and thereby movement of the table-like body 13 is limited when the tapping mechanism taps. Note that the table-like body 13 may be fixed to the workbench 10, instead of the wall 28. The controller 14 causes the (first) arm 3 to reciprocate so that the acting part 7D periodically taps the side surface of the table-like body 13, while the movement of the table-like body 13 is limited. Thus, vibration is applied to the table-like body 13.

Moreover, although in the embodiment described above, the structure in which the first acting part 7, the second acting part 8, the work extracting parts 9 and 9B, the work feeding part 21, etc. are provided beforehand to the first hand part 5 and the second hand part 6 is described, the present disclosure is not limited to the structure as long as the robot 1 performs the works to the workpieces W while these mechanisms are provided to the first hand part 5 and/or the second hand part 6. For example, these mechanisms may be constructed so as to be attachable to and detachable from the first hand part 5 and the second hand part 6. Further, for example, these mechanisms may be placed on a given place, and the robot 1 may be controlled so that the robot 1 performs the works to the workpieces W after the robot 1 attaches the placed mechanisms to the corresponding hand parts 5 and 6.

From the above description, it is apparent for a person skilled in the art that many improvements and other embodiments of the present disclosure are possible. Therefore, the above description is to be interpreted only as illustration, and it is provided in order to teach a person skilled in the art the best mode that implements the present disclosure. Details of the structures and/or functions of the present disclosure can substantially be changed without departing from the spirit of the present disclosure.

INDUSTRIAL APPLICABILITY

The robot of the present disclosure is useful for easily achievable, without arranging the jig and/or instrument for exclusive use, and without providing an advanced visual recognition system and performing the complicated control.

DESCRIPTION OF REFERENCE CHARACTERS 1, 1B Robot
2 Pedestal
3 First Aim
4 Second Arm
5 First Hand Part
6 Second Hand Part
7, 7B, 7C, 7D First Acting Part
8, 8B Second Acting Part
9, 9B Work Extracting Part
13 Table-Like Body
14 Controller
15 Work Accommodating Container
18 Imaging Unit
21 Work Feeding Part
22 Recognition Part
A1-A3, B1-B3 Joint Shaft
C Rotational Shaft
W Workpiece

What is claimed is:

1. A robot, comprising:
   a first arm having a first hand part provided to a tip end thereof, and at least one joint shaft provided between a pedestal and the first hand part;
   a first acting part configured to contact a given table-like body on which a plurality of workpieces are able to be placed, while the first acting part is provided to the first hand part;
   a second arm having a second hand part provided to a tip end thereof, and at east one joint shaft provided between the pedestal and the second hand part;
   a second acting part configured to contact the table-like body, while the second acting part is provided to the second hand part;
   a controller;
   an imaging unit configured to two-dimensionally image a placement surface of the workpieces in the table-like body in a perpendicular direction to the placement surface; and
   a recognition part configured to recognize a position of the workpiece by performing a two-dimensional pattern matching based on an image two-dimensionally captured by the imaging unit,
   wherein the controller vibrates the table-like body by controlling the first arm and the second arm to cause the first acting part and the second acting part to move in cooperation with each other in opposing directions of the first acting part and the second acting part with a given amplitude and at a given cycle, with the table-like body located between the first acting part and the second acting part while maintaining a constant distance between the first acting part and the second acting part, so that the table-like body contacted by the first acting part and the second acting part vibrates so as to reciprocate, while sliding on the workbench.

2. The robot of claim 1, wherein each of the first arm and the second arm is arranged coaxially with an axis perpendicular to the pedestal, and is constructed rotatable about the axis independently from the pedestal.

3. The robot of claim 1, wherein the imaging unit images after the vibrating operation of the table-like body.

4. The robot of claim 1, comprising
   a work extracting part configured to take out one workpiece from at least one workpiece placed on the table-like body while the work extracting part is provided to the first hand part.

5. The robot of claim 1, comprising
   a work feeding part configured to take out at least one workpiece from a given work accommodating container where the plurality of the workpieces are accommodated, and place the at least one workpiece on the placement surface of the workpiece in the table-like body, while the work feeding part is provided to the first hand part.

6. A method of controlling a robot including a first arm and a second arm, the first arm having a first hand part provided to a tip end of the first arm, and at least one joint shaft provided between a pedestal and the first hand part, the second arm having a second hand part provided to a tip end of the second arm, and at least one joint shaft provided between the pedestal and the second hand part, the method comprising:
   attaching to the first hand part a first acting part configured to contact a given table-like body on which a plurality of workpieces are able to be placed;
   attaching to the second hand part a second acting part configured to contact the table-like body;
   vibrating the table-like body by controlling the first arm and the second arm to cause the first acting part and the second acting part to contact the table-like body, with the proviso that the vibrating includes controlling the first arm and the second arm to cause the first acting part and the second acting part to move in cooperation with each other in opposing directions of the first acting part and the second acting part with a given amplitude and at a given cycle, with the table-like body located between the first acting part and the second acting part while maintaining a constant distance between the first acting part and the second acting part, so that the table-like body contacted by the first acting part and the second acting part vibrates so as to reciprocate, while sliding on the workbench;
   imaging a placement surface of the workpiece in the table-like body by an imaging unit configured to image the placement surface two-dimensionally in a perpendicular direction to the placement surface; and
   recognizing a position of the workpiece by performing a two-dimensional pattern matching based on an image two-dimensionally captured by the imaging unit.

7. The robot of claim 1, wherein
   each of the first acting part and the second acting part includes a contact surface and a protrusion, the contact surface contacting a side surface of the table-like body, the protrusion protruding from the contact surface in a direction perpendicular to the contact surface, and
   the table-like body includes recesses into which the respective protrusions of the first and second acting parts are insertable, the recesses being formed in the respective side surfaces of the table-like body, the side surfaces being contacted by the respective contact surfaces of the first and second acting parts.

\* \* \* \* \*